July 24, 1956   G. E. DUNN ET AL   2,755,640
UNIVERSAL JOINT BODY
Filed Sept. 25, 1952
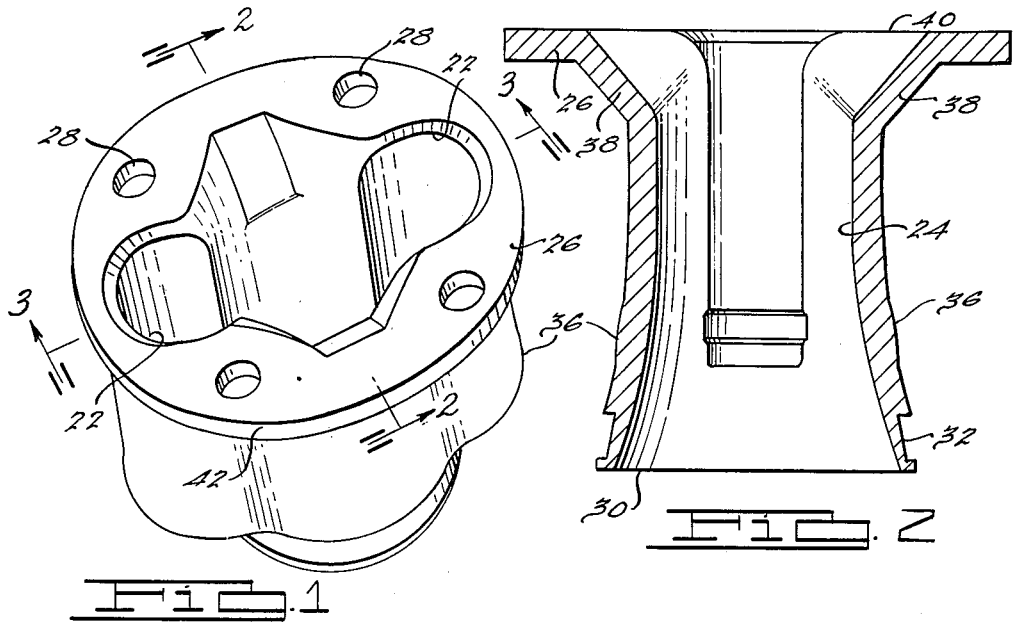
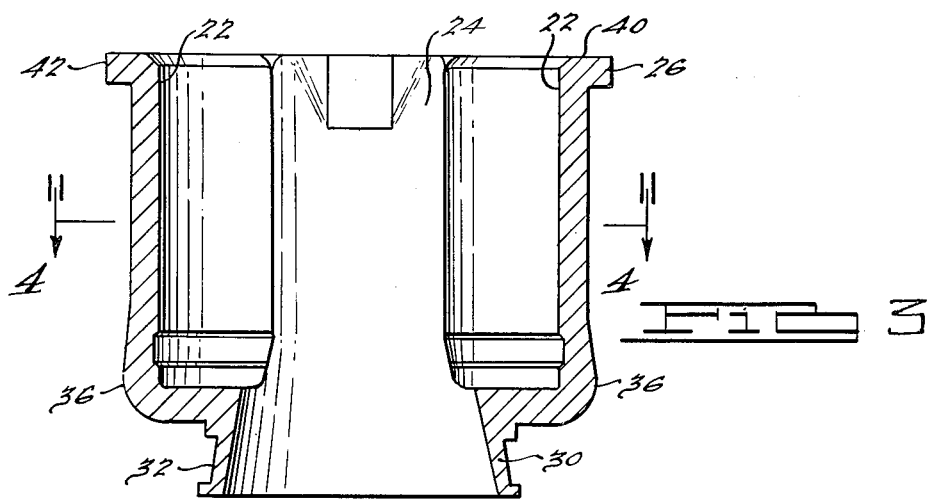
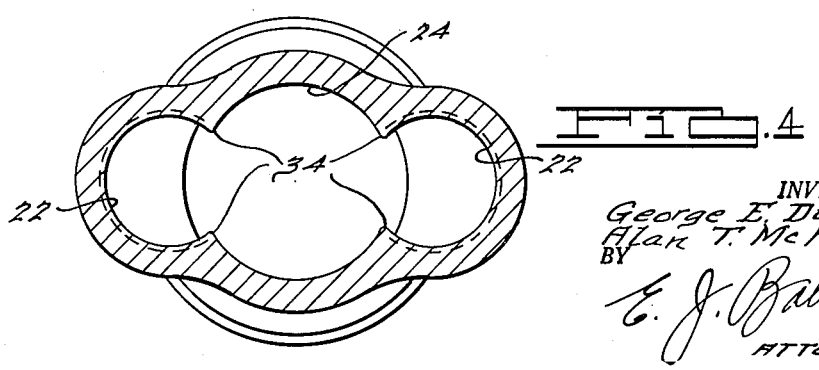
INVENTORS.
George E. Dunn,
Alan T. McHenry.
BY
ATTORNEY.

United States Patent Office 2,755,640
Patented July 24, 1956

2,755,640

UNIVERSAL JOINT BODY

George E. Dunn, Dearborn, and Alan T. McHenry, Grosse Pointe, Mich., assignors, by mesne assignments, to Chrysler Corporation, Detroit, Mich., a corporation of Delaware Application September 25, 1952, Serial No. 311,504

1 Claim. (Cl. 64—8)

This invention relates to universal joint bodies and has particular reference to a body of the sliding two-trunnion type of joint as disclosed in Warner 1,921,274.

These bodies have opposed and parallel cylindrical guides with a center bore parallel to and between and intersecting the guides, the guides being open at one end of the body and closed at the other end thereof. The body is provided with a radially extending, continuous attaching flange at the open end of the guides and with a neck at the other end defining a continuation of the center bore.

It has been the practice heretofore to make these bodies in either of two ways. According to one method, a blank of sheet stock is subjected to a series of drawing operations to form a stamped body, and while this method has in general proved satisfactory heretofore, such stamped bodies will yield under high torque loads at the intersections between the guides and the center bore. This tendency of such stamped bodies to yield at such intersections causes the joint body to open up, thereby increasing the clearances between the balls and guides, which results in deterioration and premature failure of the joint. This tendency of stamped bodies to open up at such intersections is due to the fact that such intersections are a critical part of the body and joint bodies of this type are now being used at working loads which border closely upon the capacity of the joint body. As it is not feasible for competitive and performance reasons to increase the size of the joint body, the recent advent of cars with greatly increased horsepower and torque has seriously affected further use of joints of this type using stamped bodies, in spite of the many inherent advantages of this type of joint.

Bodies of this type have heretofore also been made from forgings wherein the center bore and guides have been bored out, but the cost of machining required by this method of producing bodies has been such as to preclude its employment on joints made for original equipment purposes, as distinguished from joints made for sale to the repair trade.

According to our invention, a joint body of this type is made by a series of forging operations which are employed to extrude a heated solid metal body so as to form a rough joint body suitable for finish machining operations, the finish machine operations required being substantially the same as those required for a stamped body as heretofore made. This method has a number of advantages. In the first place, a forged body of a given size made according to the invention may be subjected to a maximum working load of about 18,000 in. lbs., whereas a body of the same size made according to the aforesaid stamping process may be employed, say, for working loads up to only about 10,000 in. lbs. Thus, this invention makes it possible to approximately double the capacity of the joint body without increasing the size.

In addition, a forged body made according to this invention employs less metal of a less expensive character than that required for stamped bodies. For example, for a given size, a slug of metal stock required for a body made according to this invention is approximately 2 lb. 4 oz. and the finished body weighs approximately 1 lb. 10½ oz., whereas the same size body made according to the conventional stamping method requires a blank of approximately 3 lb. and the resulting finished body weighs approximately 1 lb. 8 oz. Thus, according to this invention substantially less metal of a less expensive type is required, thereby substantially reducing material costs and scrap losses. The scrap from the previously described forging and machining method now generally used is considerable, since the center bore and the guides must all be bored out, and the metal so removed is all scrap.

In addition to the increase in strength due to the use of a forged body the body is strengthened at various critical places, as will be hereinafter pointed out in more detail.

A principal object of the invention, therefore, is to provide a new and improved body for universal joints of the type referred to.

Other and further objects of the invention will be apparent from the following description and claim and may be understood by reference to the accompanying drawings, of which there is one sheet, which by way of illustration shows a preferred embodiment of the invention and what we now consider to be the best mode in which we have contemplated applying the principles of our invention. Other embodiments of the invention may be used without departing from the scope of the present invention as set forth in the appended claim.

In the drawings:

Fig. 1 is a perspective view of a finished joint body.

Figs. 2 and 3 are sectional views thereof, taken in planes along the lines 2—2 and 3—3 of Fig. 1.

Fig. 4 is a transverse sectional view taken in a plane along the line 4—4 of Fig. 3.

As illustrated in Figs. 1, 2, 3 and 4, a universal joint body embodying the invention consists of a hollow, metal, one-piece body having opposed and parallel cylindrical guides 22 with a center bore 24 parallel to and between and intersecting such guides. The guides 22, sometimes called raceways, are open at one end of the body and closed at the other end thereof. A radially extending, continuous attaching flange 26 is formed at the open end of the guides, the flange being provided with bolt holes 28 to permit the assembly of the body to the companion flange with which it is used. The center bore 24 is open at both ends. A bell mouthed neck 30 defines a continuation of the bore and projects beyond the closed end of the guides and is provided with an annular groove 32 forming a seat for the sealing boot of the joint. Between the flange 26 and the neck 30 the body is substantially oval shaped in transverse section normal to the bore and guides.

The wall thickness of the body is substantially uniform from the open to the closed end of the guides and around the body normal to the guides, except adjacent the intersections 34 of the guides 22 and the center bore 24, and at such intersections the wall thickness is substantially greater so as to reinforce the body along the lines of the intersections. The body is also formed to have an integral external stiffening rib 36 which extends transversely around the body adjacent the closed end of the guides. This rib 36, together with the thicker wall sections at the intersections 34, strengthens and stiffens the body so as to reduce the tendency of the raceways to open up at the intersections between the guides 22 and the center bore 24. The body is also formed to have diametrically opposed stiffening ribs 38 which extend between the flange 26 and the external portions of the center bore 24.

The guides or raceways 22 are finished by machine operations since they form bearing surfaces for the balls and centering buttons, and the guides 22 and the center bore 24 are also case hardened. The face 40 of the flange 26 is provided with a finished surface in a plane normal to the axes of the guides 22 and center bore 24, and in addition the outer rim 42 of the flange is provided with a finished surface concentric with the axis of the center bore 24 for accurate nesting of the body in the companion flange.

While we have illustrated and described a preferred embodiment of our invention, it is understood that this is capable of modification and we therefore do not wish to be limited to the precise details set forth but desire to avail ourselves of such changes and alterations as fall within the purview of the following claim.

We claim:

A hollow, metal, universal joint body forged from a single piece of metal having opposed and parallel cylindrical guides with a center bore parallel to and between and intersecting such guides, said guides being open at one end of said body and closed at the other end thereof, an attaching flange extending radially and continuously around said body at the open end of said guides, said center bore being open at both ends, a bell mouthed neck defining a continuation of said bore and projecting beyond the closed end of said guides, said body being oval shaped in transverse section normal to said bore and guides and between said flange and neck, the wall thickness of said body being substantially uniform from the open to the closed end of said guides and around the body normal to said guides except adjacent the intersections of said guides and center bore and except adjacent the closed end of the guides, said wall thickness adjacent and along said intersections being substantially greater so as to reinforce said body at the intersections of said center bore and guides, said wall adjacent the closed end of said guides being of increased thickness and outwardly bulged so as to form an integral external stiffening rib extending transversely around the body at the closed end of the guides, and said body being provided with diametrically opposed stiffening ribs between said flange and the external portion of said center bore.

References Cited in the file of this patent

UNITED STATES PATENTS

| 1,297,129 | Emerson | Mar. 11, 1919 |
| 1,921,274 | Warner | Aug. 8, 1933 |
| 2,057,875 | Benham | Oct. 20, 1936 |
| 2,304,666 | Sturges | Dec. 8, 1942 |